(12) United States Patent
Stevenson

(10) Patent No.: US 8,113,268 B2
(45) Date of Patent: Feb. 14, 2012

(54) SEQUENTIAL VALVE MEMBER DRIVING MECHANISM FOR AN HVAC SYSTEM

(75) Inventor: Mark W. Stevenson, Appleton, NY (US)

(73) Assignee: Delphi Technologies, Inc., Troy, MI (US)

( * ) Notice: Subject to any disclaimer, the term of this patent is extended or adjusted under 35 U.S.C. 154(b) by 815 days.

(21) Appl. No.: 12/187,782

(22) Filed: Aug. 7, 2008

(65) Prior Publication Data
US 2009/0032758 A1 Feb. 5, 2009

Related U.S. Application Data

(63) Continuation-in-part of application No. 11/115,567, filed on Apr. 27, 2005.

(60) Provisional application No. 60/605,053, filed on Aug. 27, 2004.

(51) Int. Cl.
*B60H 1/00* (2006.01)
(52) U.S. Cl. ........ 165/42; 165/43; 165/103; 237/12.3 A; 237/12.3 B; 454/156; 454/160; 454/161; 251/212; 137/865; 137/870; 137/628; 137/625.44
(58) Field of Classification Search .................... 165/42, 165/43, 103; 237/12.3 A, 12.3 B; 454/121, 454/156, 160, 161; 251/212; 137/865, 870, 137/628, 625.44
See application file for complete search history.

(56) References Cited

U.S. PATENT DOCUMENTS

| | | | |
|---|---|---|---|
| 2,976,884 A | 3/1961 | Kurth et al. |
| 3,068,891 A | 12/1962 | Panning et al. |
| 3,544,045 A | 12/1970 | Butscher |
| 4,899,809 A | 2/1990 | Takenaka |
| 6,092,592 A | 7/2000 | Toyoshima |
| 6,270,400 B1 | 8/2001 | Tsurushima |
| 6,305,462 B1 | 10/2001 | Tsurushima |
| 6,347,988 B1 | 2/2002 | Kurokawa |
| 6,382,305 B1 | 5/2002 | Sano |
| 6,450,877 B2 | 9/2002 | Tsurushima |

(Continued)

FOREIGN PATENT DOCUMENTS
DE 10201771 A1 7/2003
(Continued)

OTHER PUBLICATIONS

EP-05 07 6842 European Search Report dated Oct. 12, 2005.

*Primary Examiner* — John Ford
(74) *Attorney, Agent, or Firm* — James M. Chan

(57) ABSTRACT

An air conditioning system of the present invention for an automotive vehicle includes a housing having at least two sections connected by two side by side air passage. A blower device of the air conditioning system discharges air into the housing. An evaporator is disposed in one of the sections for taking heat from the air discharged from the blower device to produce cool air. A heater is disposed in the other section positioned downstream of the evaporator for adding heat to the cool air to produce warm air. First and second sliding valve plates mechanically communicating with a driving mechanism of the present invention are supported by the housing for selectively closing the two side by side air passages thereby regulating air flow of cool and warm air.

22 Claims, 7 Drawing Sheets

U.S. PATENT DOCUMENTS

| | | |
|---|---|---|
| 6,508,703 B1 | 1/2003 | Uemura |
| 6,569,009 B2 | 5/2003 | Nishikawa |
| 6,612,922 B2 | 9/2003 | Uemura |
| 6,688,964 B2 | 2/2004 | Uemura |
| 6,814,138 B2 | 11/2004 | Tsurushima et al. |
| 7,059,959 B2* | 6/2006 | Lindner ............ 454/152 |
| 7,431,638 B2* | 10/2008 | Natsume et al. ......... 454/121 |
| 2004/0194947 A1* | 10/2004 | Ito et al. ............ 165/203 |

FOREIGN PATENT DOCUMENTS

| | | |
|---|---|---|
| JP | 01172014 A | 7/1989 |
| JP | 09175147 A | 7/1997 |
| JP | 09175148 A | 7/1997 |
| JP | 11254943 A * | 9/1999 |

* cited by examiner

US 8,113,268 B2

SEQUENTIAL VALVE MEMBER DRIVING MECHANISM FOR AN HVAC SYSTEM

CROSS REFERENCE TO RELATED APPLICATION

This application claims the benefit of a provisional application Ser. No. 60/605,053 filed on Aug. 27, 2004 and is a continuation in part of application Ser. No. 11/115,567 filed on Apr. 27, 2005.

BACKGROUND OF THE INVENTION

1. Field of the Invention

The subject invention relates to an automotive heating ventilation and air conditioning (HVAC) systems of the type, and more particularly to a door mechanism of the HVAC system, which can slide therein to control air flow.

2. Description of the Prior Art

Modern vehicles are designed to provide passengers with comfort, convenience, and safety. One comfort system that few could live without is an air conditioning system. The air conditioning system is used in the modern vehicles is designed to cool, dehumidify, clean, and circulate the air in a vehicle. The air conditioning system presents a closed, pressurized system that has a compressor, a condenser, a receiver/dehydrator (R/D), an expansion valve or orifice tube and a plurality of additional components, such as a box shaped housing, known as a heating, ventilation and air conditioning system (HVAC system). A heart of the HVAC system, used in combination therewith to increase efficiency and dependability of the air conditioning system, is a box shaped housing containing an evaporator and heater, which are spaced apart, with inner faces that face one another and outer faces that face away from one another. Such systems obviously require enough space between the evaporator and the heater for air mixing doors, positioned therebetween, to swing, limiting how compact the entire HVAC system can be made. In addition, the air mixing doors tend to lack linearity. That is, they tend to be all on, or all off, but are far less adept at attaining.

Alluding to the above, the HVAC systems permit occupants to select a desired temperature for their individual zones and automatically maintain these zones at the pre-selected temperature. Such operation necessarily requires the use and operation of multiple valves and ducts to achieve the desired operation of the HVAC system. While the sophistication and complexity of the HVAC system has steadily increased, the design of valves utilized in HVAC system has remained relatively unchanged throughout the years. The HVAC systems now include a number of separate valves that have been automated through the use of various types of actuators mounted exteriorly to the HVAC module and either connected to the valve directly or with mechanical linkages such as gears, push rods, or mechanical arms.

Various HVAC systems and designs are disclosed in the U.S. Pat. No. 4,899,809 to Takenaka et al.; U.S. Pat. No. 6,092,592 to Toyoshima et al.; U.S. Pat. No. 6,270,400 to Tsurushima et al.; U.S. Pat. No. 6,305,462 to Tsurushima et al.; U.S. Pat. No. 6,347,988 to Kurokawa et al.; U.S. Pat. No. 6,382,305 to Sano; U.S. Pat. No. 6,450,877 to Tsurushima et al.; U.S. Pat. No. 6,508,703 to Uemura et al.; U.S. Pat. No. 6,569,009 to Nishikawa et al.; U.S. Pat. Nos. 6,612,922 and 6,688,964 both to Uemura et al.

The U.S. Pat. No. 6,092,592 to Toyoshima et al., for example, teaches an HVAC unit for a vehicle having a temperature control system. A first air mixing door of the temperature control system is used for adjusting an opening degree of a cool air passage through which air having passed through an evaporator bypasses a heater core. A second air mixing door of the temperature control system is used for adjusting an opening degree of an air inlet portion of the heater core. The first and second air mixing doors include a rotation shaft at a center and connected to a housing to facilitate a butterfly-like rotation of the first and second doors to mix cool and hot air. The first and second mixing doors are substantially spaced from one another thereby diminishing packaging value of the air conditioning system.

The U.S. Pat. No. 6,305,462 to Tsurushima et al. teaches a door mechanism for an automotive air conditioning system. Unfortunately, the door mechanism taught by the U.S. Pat. No. 6,305,462 to Tsurushima et al. separates cold and hot air streams therefore without promoting mixing of the cold and hot air streams, which results in the need for various baffles and/or a mixing door to be added to achieve a desired temperature. Another example, taught by the U.S. Pat. No. 6,688, 964 to Uemura et al. is a door mechanism, wherein a pair of door valves are formed from a polymeric film and are spaced from one another at a fixed distance.

There is a constant need in the area of an automotive heating ventilation and air conditioning (HVAC) system for a door mechanism, which will improve packaging characteristics of the HVAC system, improve mixing of cold and hot air streams to achieve a desired temperature to control air flow into the interior of the vehicle and to eliminate baffles or mixing doors.

SUMMARY OF THE INVENTION

An air conditioning assembly for an automotive vehicle includes a housing defining two air passages disposed in side by side relationship. A first sliding valve plate and a second sliding valve plate are both supported by the housing for sliding movement across the air passages between a first position for closing one of the air passages and a second position for closing the other of the air passages. A driving mechanism of the air conditioning assembly is supported by the housing. The driving mechanism moves the first sliding valve plate from the first position to the second position while the second sliding valve plate remains in the first position. The driving mechanism thereafter moves the second sliding valve plate from the first position to the second position while the first sliding valve plate remains in the second position.

An advantage of the present invention is to provide a driving mechanism for sliding first and second valve plates, which improves packaging characteristics of the HVAC system.

Another advantage of the present invention is to provide a driving mechanism that improves mixing of cold and hot air streams to achieve a desired temperature to control air flow into the interior of the automotive vehicle by sliding the first and second valve plates between the first and second positions to achieve a desired comfort level for a passenger.

Still another advantage of the present invention is to provide a driving mechanism that eliminates the need for baffles or mixing doors used in the prior art patents for mixing of cold and hot air streams to achieve a desired temperature in the interior of the automotive vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE EXEMPLARY EMBODIMENT

Figure 1:
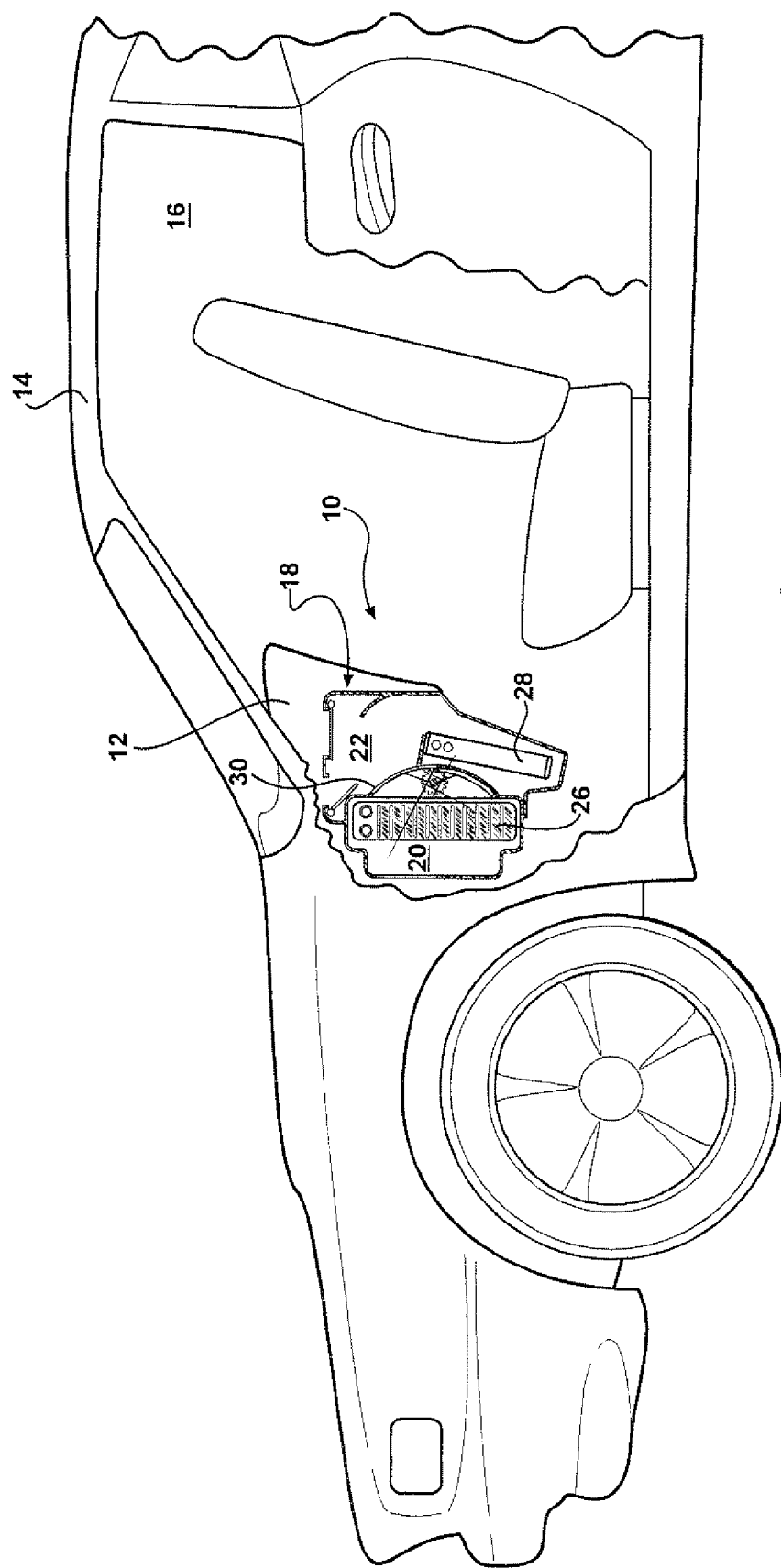
FIG. 1 is a front and partially cross sectional view of an automotive vehicle showing an inventive HVAC system disposed therein.

Referring to FIGS. 1, 6, 8, and 10, an air conditioning system 10, generally shown, is disposed in an instrument panel 12 on the front side of a passenger compartment 16 of a vehicle 14. The air conditioning system 10 includes a housing 18, generally indicated, having at least two air passages 22 or sections 20 disposed in side by side relationship. A blower device 24 is connected to the housing 18 for introducing air therein. An evaporator 26 is disposed in one of the sections 20 of the housing 18 for taking heat from the air discharged from the blower device 24 to produce cool air. A heater 28 is disposed in the other of the sections 20 and is positioned downstream of the evaporator 26 for adding heat to the cool air to produce warm air.

Figure 2:
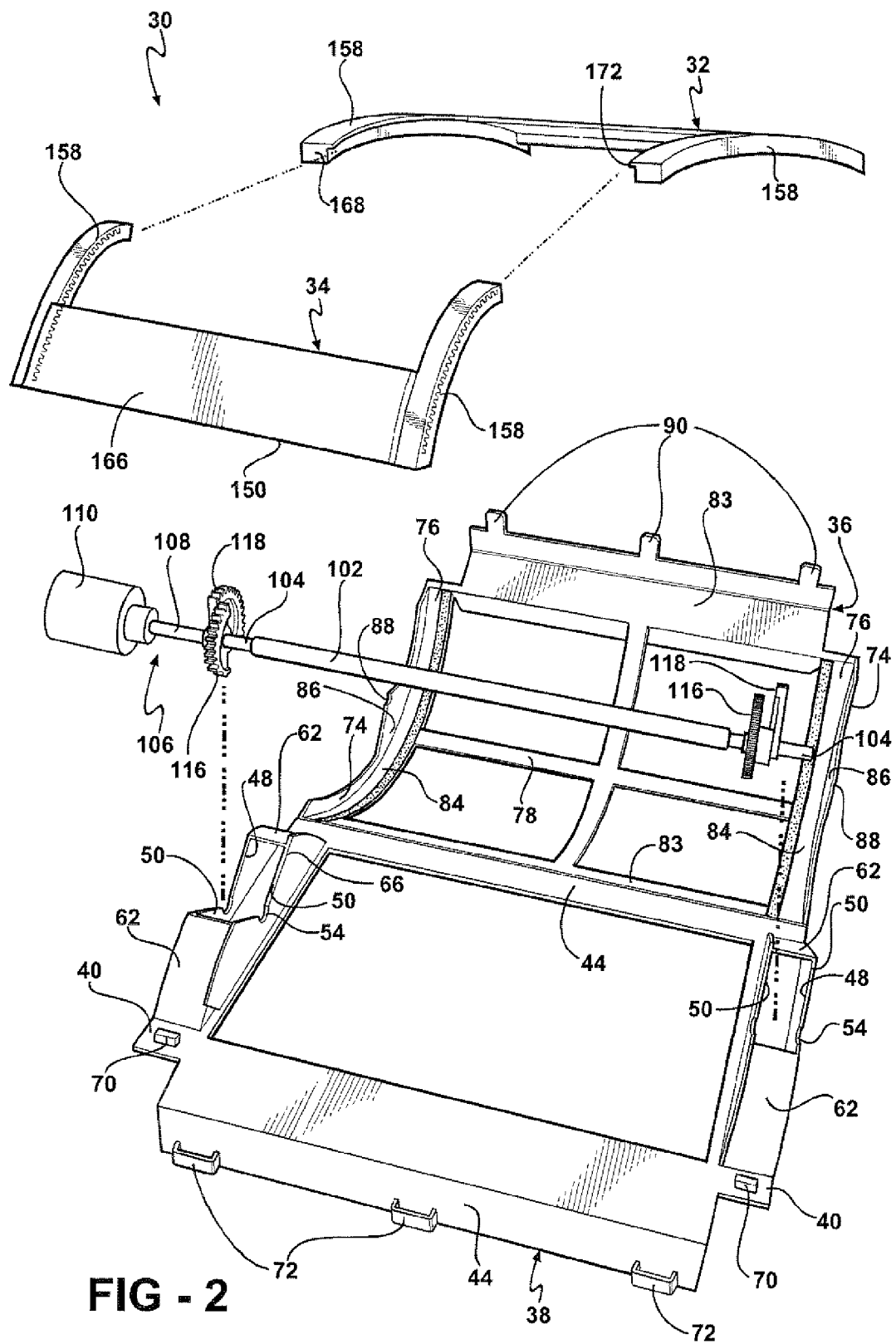
FIG. 2 is an exploded view of a housing of the HVAC system for holding first and second sliding valve plates.

As illustrated in FIG. 2, a support frame 30, generally shown, of the air conditioning system 10 is designed for holding a first sliding valve plate 32 and a second sliding valve plate 34, discussed in greater details further below. The support frame 30 is supported by the housing 18 and extends between the two sections 20. The support frame 30 includes top portion 36 (generally indicated in FIG. 2) and a bottom portion 38 (generally indicated in FIG. 2) for facilitating slidable movements of the aforementioned first and second sliding valve plates 32, 34. The bottom portion 38 includes bottom side walls 40 spaced from one another and interconnected by spaced bottom end walls 44. A pocket portion 48 including a pair of spaced V-shaped edges 50 is disposed on each of the bottom side walls 40. Each of the V-shaped edges 50 has a first or bottom semi-circular opening 54 defined therein.

Referring to FIG. 2, the bottom portion 38 further includes a pair of convex tracks 62 with each of the convex tracks 62 being integral with and extending from the pocket portion 48 to each of the spaced bottom side walls 40 of the bottom portion 38 to define a track connection therebetween. A stopper 70 is disposed on each of the bottom side walls 40 for limiting slidable motion of the aforementioned first and second sliding valve plates 32, 34. A plurality of female connectors 72 are disposed on and spaced along the bottom portion 38.

As illustrated in FIG. 2, the top portion 36 (generally indicated) of the support frame 30 is pivotably connected, or connected by an integral lunge, to the bottom portion 38. The top portion 36 may be pivoted into overlapping engagement with the bottom portion 38. The top portion 36 further includes a pair of top side walls 76 interconnected by at least one spaced member 78 laterally extending therebetween. A pair of spaced traverse walls 74 are integral with and extend upwardly from the top side walls 76. The top portion 36 also includes top end walls 83 being integral with and interconnecting the ends of the top side walls 76 of the top portion 36.

Each of the top side walls 76 presents a concave track 84 and an outer lip portion 86 being integral with each of the traverse walls 74 and extending outwardly from the concave track 84 of each of the top end walls 83. Each of the concave tracks 84 is cooperable with the convex tracks 62 of the bottom portion 38. As best shown in FIG. 2, the outer lip portion 86 presents a V-shape integral with and extending from each of the concave tracks 84 to define a complimentary engagement with the V-shaped edge 50 of the aforementioned pocket portion 48 of the bottom portion 38. The outer lip portion 86 presents a second or top semi-circular opening 88 for complementing with the first or bottom semi-circular opening 54 to define a circular window therebetween. The top portion 36 of the support frame 30 further includes a plurality of male connectors 90 spaced to correspond with the female connectors 72 of the bottom portion 38. As the top portion 36 and the bottom portion 38 of the housing 18 are engaged to one another, the male connectors 90 of the top portion 36 mechanically engaged the female connectors 72 of the bottom portion 38 to lock the top and bottom portions 36, 38 together. It should be appreciated that the arrangement of the male and female connectors 90, 72 could be reversed. In other words, the female connectors 72 could be disposed on the top portion 36 and the male connectors 90 could be disposed on the bottom portion 38.

Figure 3:
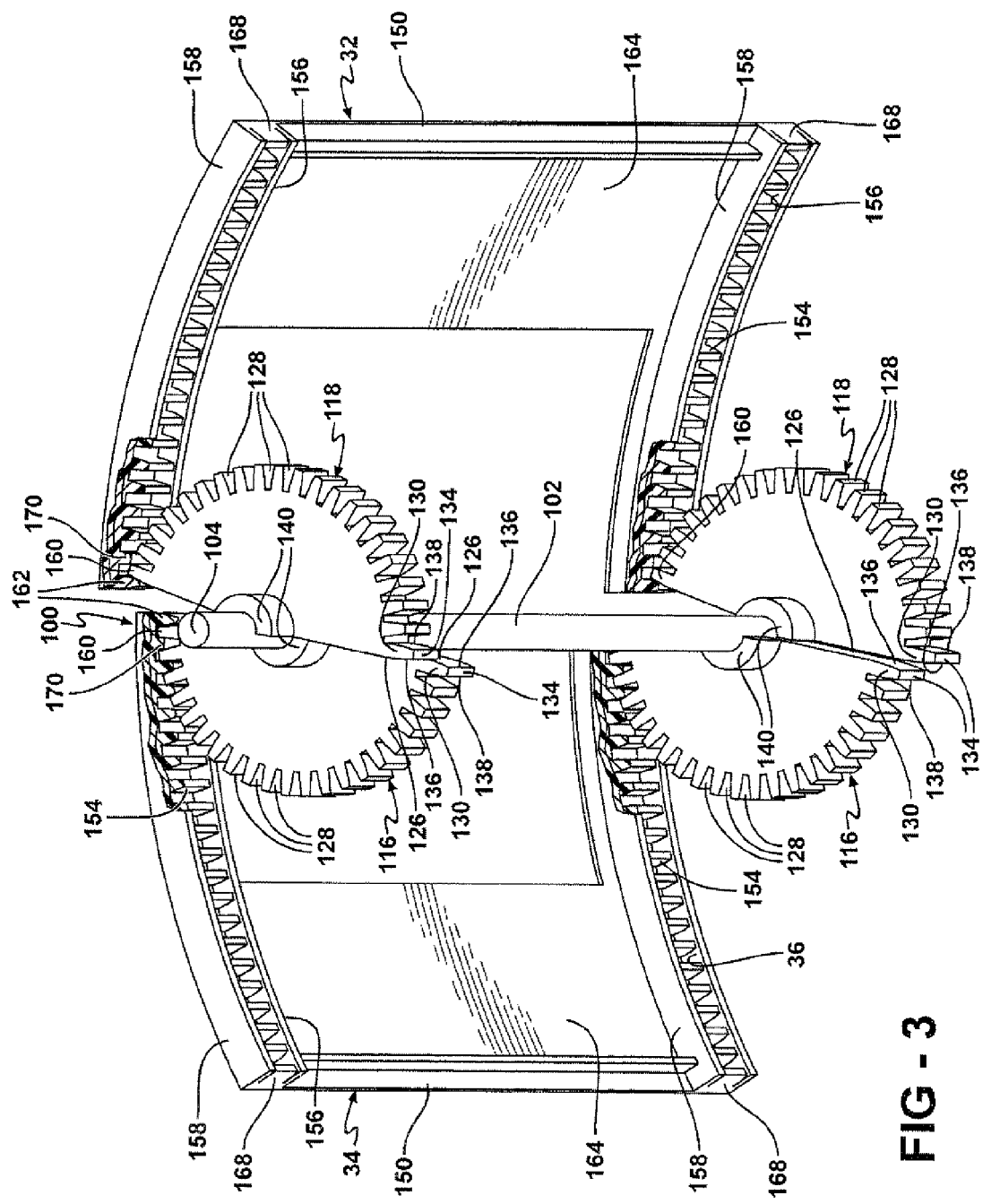
FIG. 3 is perspective and partially cross sectional view of the first and second sliding valve plates and rotatable shaft with partial gears for mechanically engaging and driving the first and second sliding valve plates within the housing between various air mixing positions.
Figure 4:
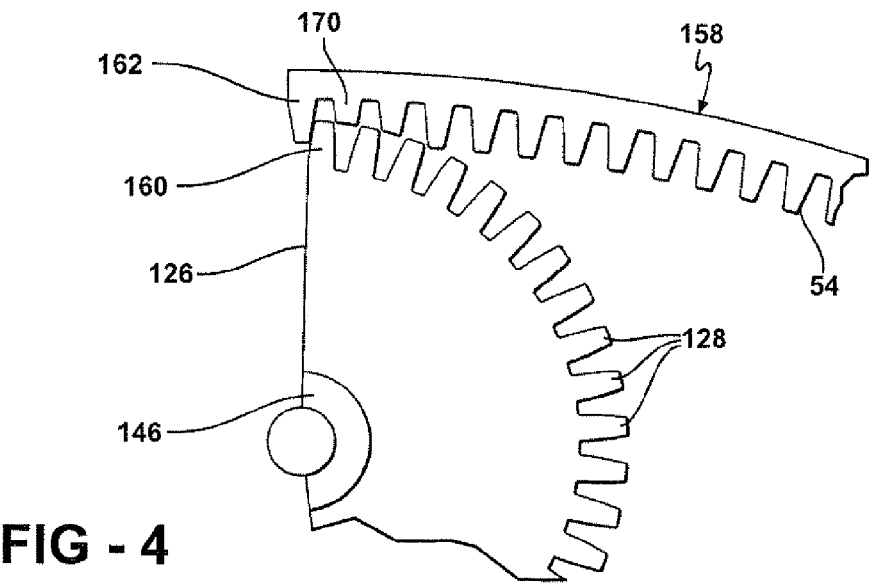
FIG. 4 is a top and fragmentary view of one of the partial gears mechanically engaging the geared surface of one of the racks.
Figure 5:
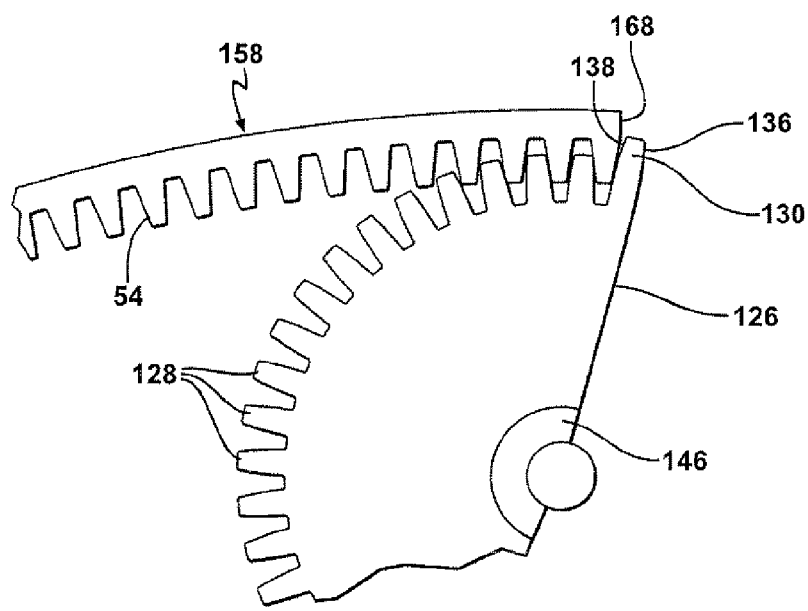
FIG. 5 is a top and fragmentary view of the lug of one of the partial gears engaging the last rack tooth of one of the racks to hold the air conditioning system full one of the full hot position and the full cold position.
Figure 6:
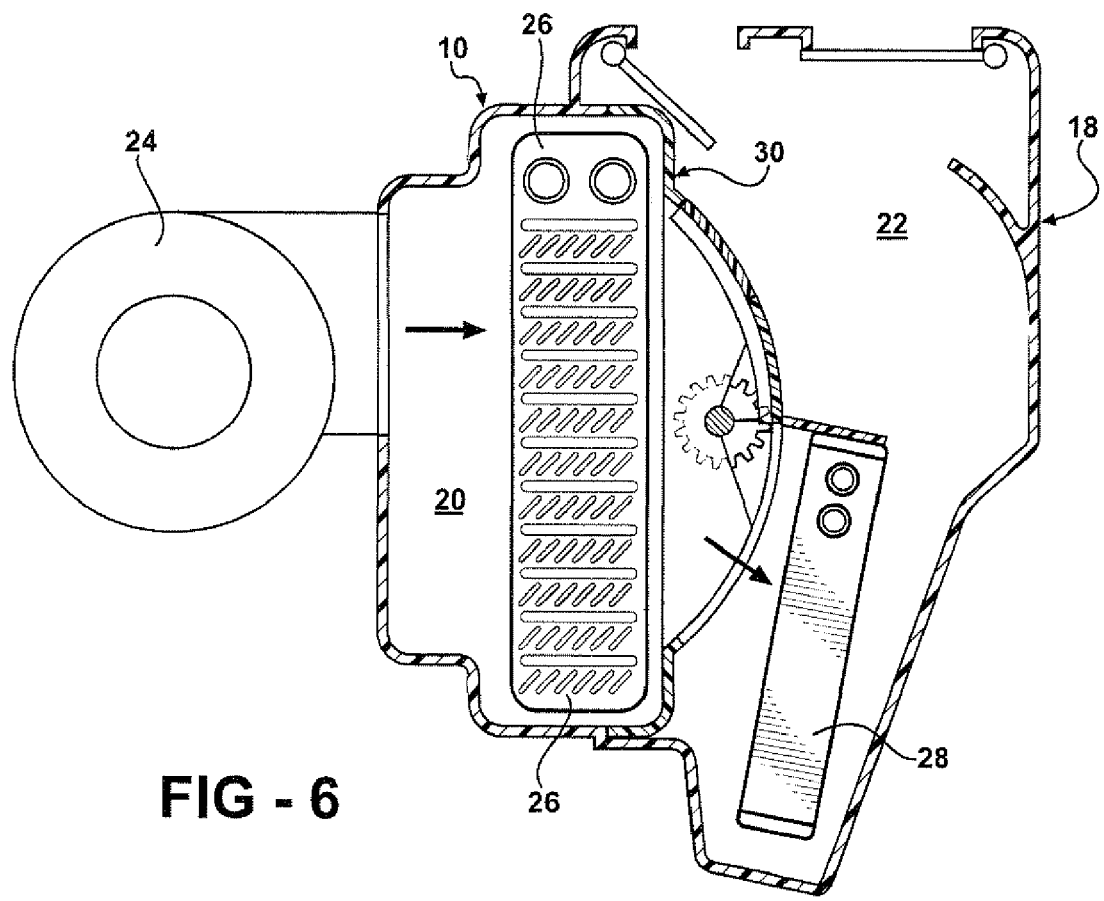
FIG. 6 is a cross sectional view of the HVAC system with the housing disposed therein with the first and second sliding valve plates connected to one another in a full hot position for directing the entire air stream through a heater core.

Referring to FIG. 3, a driving mechanism 100 is generally indicated. The driving mechanism 100 includes a rotatable shaft 102 extending between terminal ends 104. The rotatable shaft 102 is supported by and extends through the aforementioned circular window. A crank 108 is connected to one of the terminal ends 104 of the rotatable shaft 102, and an actuator 110 is operably connected to the crank 108 for rotating the rotatable shaft 102 in clockwise and counterclockwise directions with respect to different operational modes of the air conditioning system 10.

The driving mechanism 100 includes a plurality of inner partial gears 116 and a plurality of outer partial gears 118 with each of the partial gears 116, 118 extending radially from the rotatable shaft 102 and being rigidly connected to and rotatable with the rotatable shaft 102. Each of the partial gears 116, 118 is housed in the pocket portion 48 of the bottom portion 38 of the support frame 30. Each of the partial gears 116, 118 presents a diametrical side 126 and a semi-circular periphery presenting a plurality of spaced teeth 128. The spaced teeth 128 are integral with and extend radially outwardly from the semi-circular periphery of each of the partial gears 116, 118. The inner and outer partial gears 116, 118 are spaced from one another longitudinally along the rotatable shaft 102 to define a gap therebetween.

As it will become more illustrative as the description of the present invention proceeds, the diametrical side 126 of each of the inner partial gears 116 oppositely faces the diametrical side 126 of each of the outer partial gears 118. Each of the partial gears 116, 118 further includes a first gear tooth 160 disposed on one end of the semi-circular periphery and a lug 130 disposed on the other end of the semi-circular periphery. Each of the lugs 130 presents a head 134 and an inclined side 136 extending from the head 134 and interconnecting the diametrical side 126 of the associated partial gear with the head 134 of the lug 130. A straight side 138 of each lug 130 extends from the head 134 and interconnects the head 134 with the spaced teeth 128 of the associated gear.

Each of the partial gears 116, 118 further includes a neck 140 being integral with and extending perpendicularly from each of the partial gears 116, 118 along the rotatable shaft 102 to receive a pin (not shown) extending therethrough to define the aforementioned rigid connection of each partial gear to the rotatable shaft 102 in a manner known to those skilled in the art. It should also be appreciated that any other means to connect the partial gears 116, 118 to the rotatable shaft 102 may also be used including, but not limited to, a splined connection.

As further illustrated in FIG. 3, the first sliding valve plate 32 and the second sliding valve plate 34 are both generally indicated and supported by the support frame 30. The first sliding valve plate 32 and the second sliding valve plate 34 each present a generally barreled configuration and include a pair of plate end walls 150. The first sliding valve plate 32 and the second sliding valve plate 34 each include a pair of opposing racks 158 being integral with and extending from the associated plate end wall 150 to a distal end.

Each of the racks 158 presents a geared surface 154 extending from a first rack tooth 162 disposed at the distal end of each of the racks 158 to a last rack tooth 168 to define a meshing engagement with the plurality of spaced teeth 128 of one of the partial gears 116, 118. The first rack tooth 162 is larger the rest of the geared surface 154 and the second rack tooth 170 is shorter than the rest of the geared surface 154. Each of the racks 158 presents a pair of opposite sliding lips 156 disposed on either side of the geared surface 154. The opposite sliding lips 156 extend along the geared surface 154 of the opposing racks 158 between the first rack tooth 162 and the last rack tooth 168. Each of the first and second sliding valve plates 32, 34 presents an internal surface 164 and an external surface 166. The external surface 166 of the second sliding valve plate 34 faces the internal surface 164 of the first sliding valve plate 32 to present an overlapping engagement between one another in one operational mode with the first sliding valve plate 32 overlapping the second sliding valve plate 34. The pair of opposing racks 158 of the second sliding valve plate 34 are slidably disposed inward of the opposing racks 158 of the first sliding valve plate 32 with the opposing racks 158 of the second sliding valve plate 34 being supported and moved along the opposing sliding lips 156 of the first sliding valve plate 32. As such, the geared surface 154 of each of the opposing racks 158 of the second sliding valve plate 34 mechanically engages the spaced teeth 128 of one of the inner partial gears 116, and each of the opposing racks 158 of the first sliding valve plate 32 mechanically engages the spaced teeth 128 of one of the outer partial gears 118.

The first and second sliding valve plates 32, 34 present a generally barreled configuration to mate with the barreled configuration of the support frame 30, as shown in FIGS. 1 through 11. Alternatively, the first and second sliding valve plates 32, 34 may present a planar configuration to mate with the support frame 30 having planar configuration (both not shown).

Figure 7:
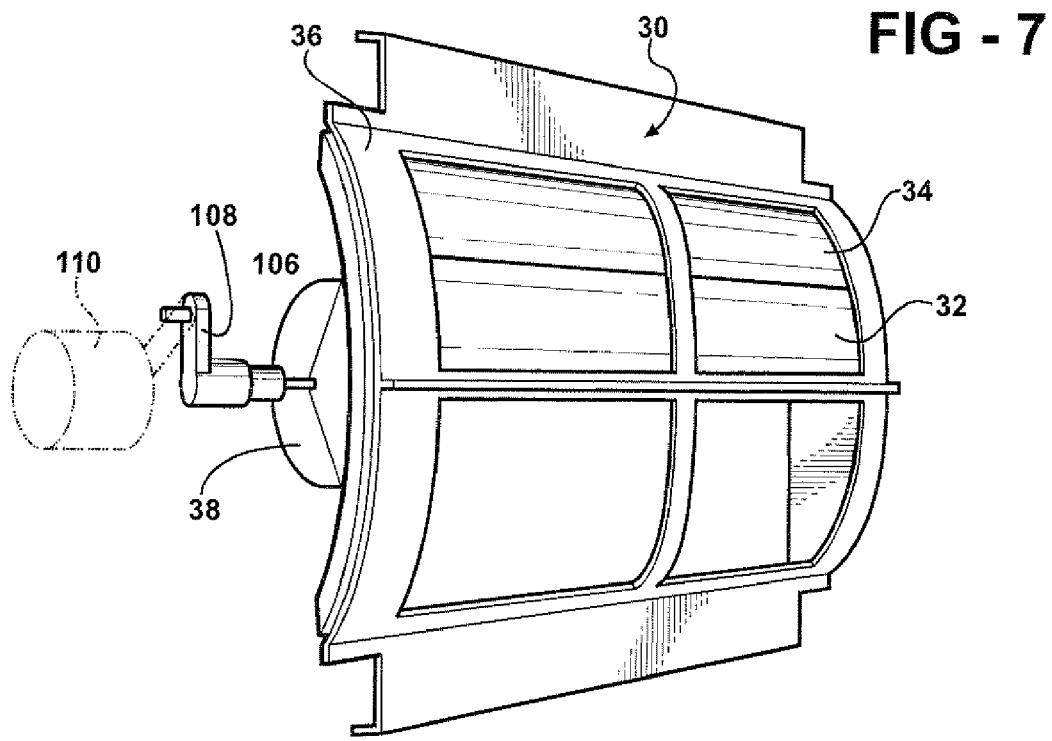
FIG. 7 is a perspective view of the housing with the first and second sliding valve plates disposed therein in the full hot position.
Figure 8:
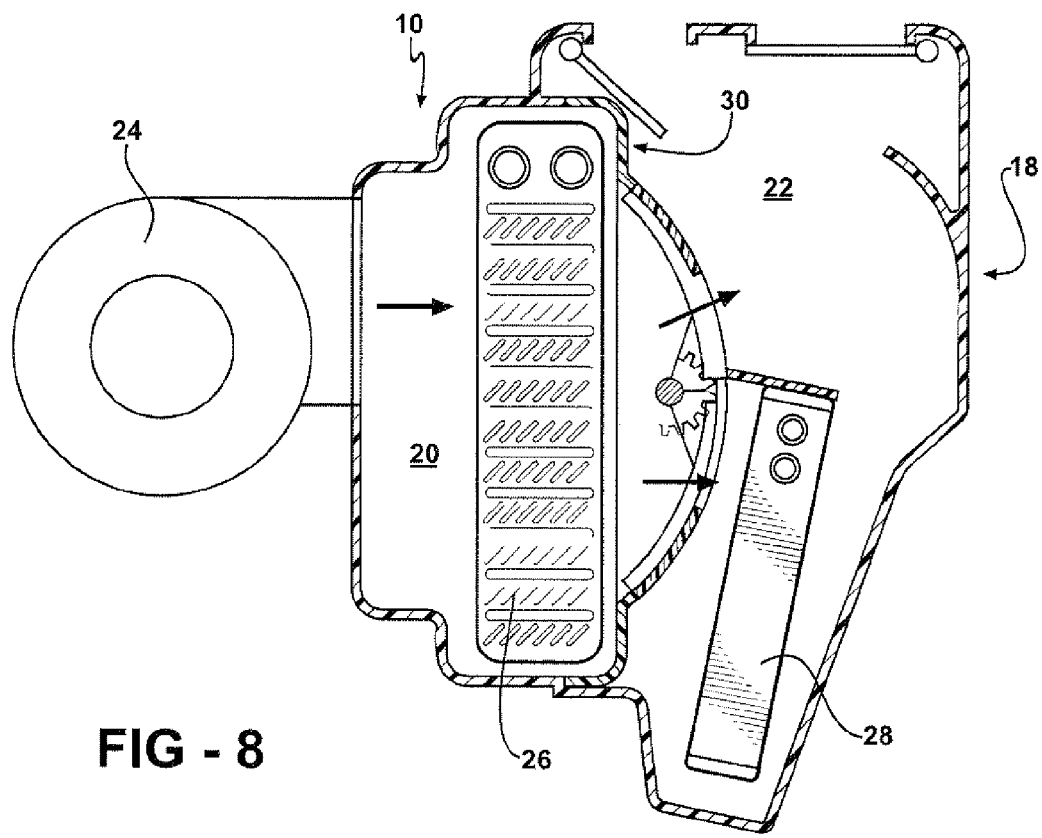
FIG. 8 is a cross sectional view of the HVAC system with the housing disposed therein with the first and second sliding valve plates spaced one from the other a full air mixing position.
Figure 9:
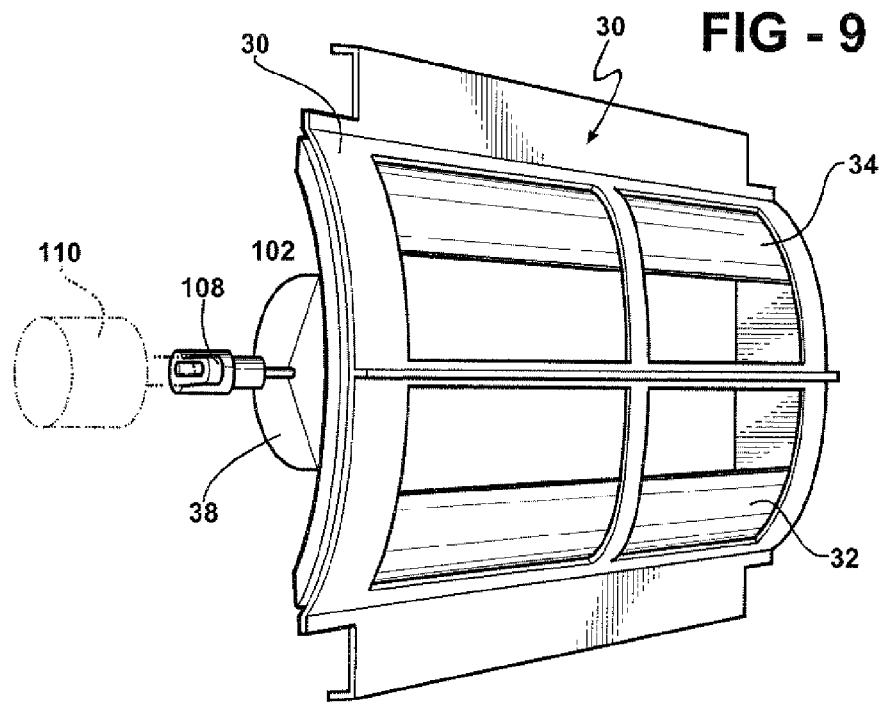
FIG. 9 is perspective view of the housing with the first and second sliding valve plates spaced one from the other in the full air mixing position.
Figure 10:
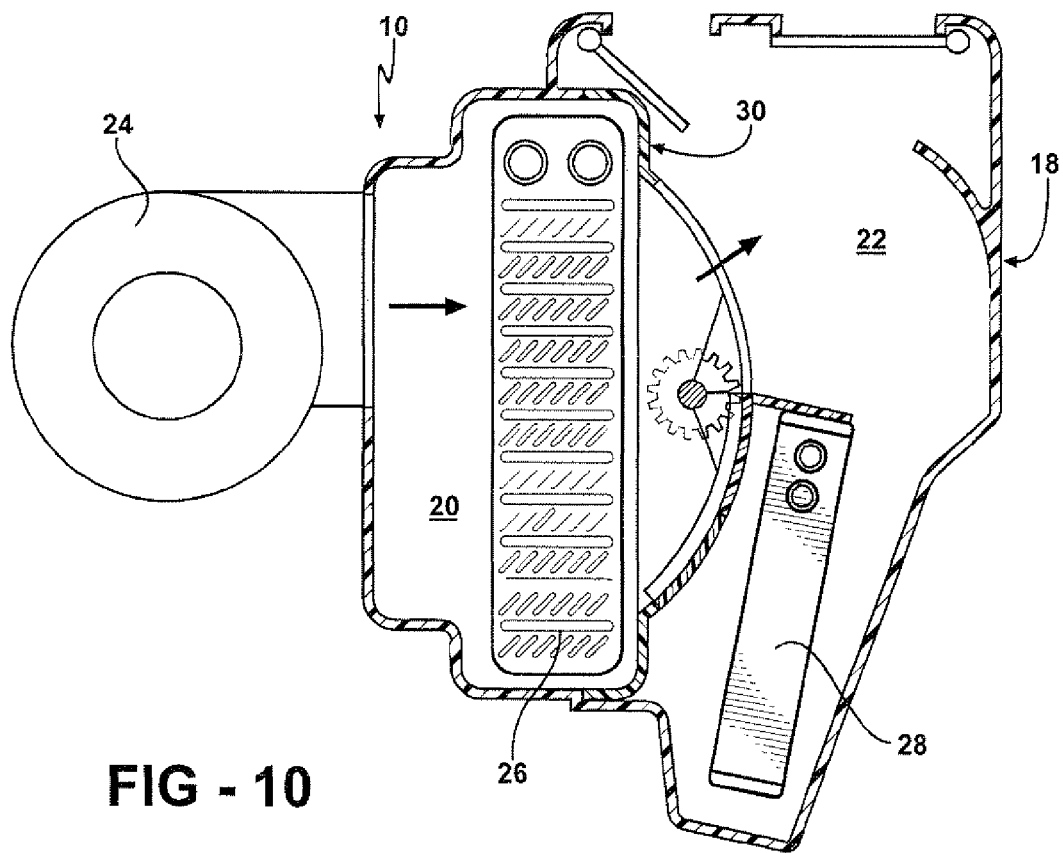
FIG. 10 is a cross sectional view of the HVAC system with the housing disposed therein with the first and second sliding valve plates connected to one another in a full cold position for blocking the entire air stream passage through the heater core.
Figure 11:
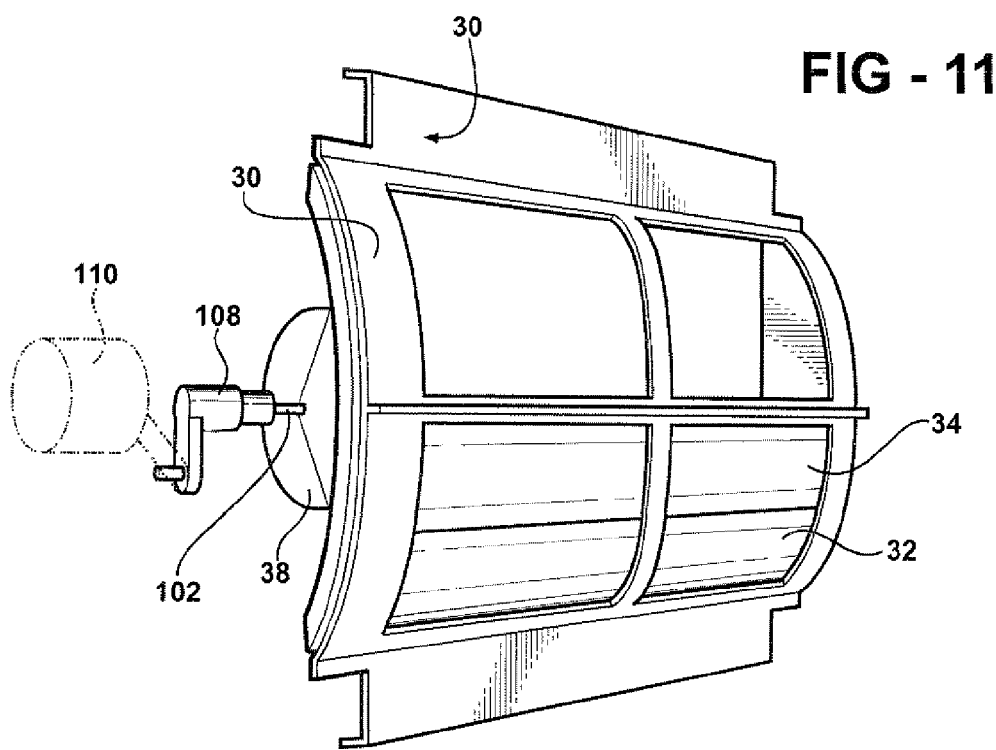
FIG. 11 is perspective view of the housing with the first and second sliding valve plates disposed therein in the full cold position.

In operation, as best shown in FIGS. 3 through 11 the actuator 110 rotates the rotatable shaft 102 in one of a clockwise and a counter-clockwise direction thereby rotating the partial gears 116, 118 in the same direction. From the full mixing position, as shown in FIGS. 3, 8, and 9, when the actuator 110 rotates the driving mechanism 100 in the clockwise direction, the spaced teeth 128 of the outer partial gears 118 engage the geared surface 154 of the opposing racks 158 of the first sliding valve plate 32 and push it to a stop position with the plate end wall 150 of the first sliding valve plate 32 engaging the stoppers 70 of the support frame 30. The first gear tooth 160 of each of the outer partial gears 118 breaks free from engagement with the geared surface 154 by clearing the shorter second rack tooth 170 of the associated rack 158. As the driving mechanism 100 continues to rotate, the first sliding valve plate 32 remains stationary and abutting the stoppers 70 of the support frame 30 while the teeth 128 of the inner partial gears 116 engage the geared surface 154 of the opposing racks 158 of the second sliding valve plate 34 to slide the second sliding valve plate 34 into overlapping relationship with the first sliding valve plate 32. The second sliding valve plate 34 continues to slide until the first rack tooth 162 of each of the opposing racks 158 of the second sliding valve plate 34 abuts the plate end wall 150 of the first sliding valve plate 32. At this point, the air conditioning system 10 is in a full cold position, as shown in FIGS. 10 and 11 and all of the air from the blower is directed around the heater 28. In the full cold position, the lugs 130 of the inner partial gears 116 engage the last rack tooth 168 of the corresponding rack 158 to hold the first and second sliding valve plates 32, 34 in the full cold position.

The actuator 110 then turns the driving mechanism 100 in the counterclockwise direction and the teeth 128 of the inner partial gears 116 engage the geared surface 154 of the opposing racks 158 of the second sliding valve plate 34 to slide the second sliding valve plate 34 away from the first sliding valve plate 32 while the first sliding valve plate 32 remains stationary. Once the opposing lips 156 of the second sliding valve plate 34 slide free of the opposing lips 156 of the first sliding valve plate 32, the air conditioning system 10 is returned to the full mixing position shown in FIGS. 3, 9, and 9 with an equal amount of the air from the blower device 24 bypassing the heater 28 and flowing through the heater 28.

As the actuator 110 continues to turn the driving mechanism 100 in the counterclockwise direction, the spaced teeth 128 of the inner partial gears 116 engage the geared surface 154 of the opposing racks 158 of the second sliding valve plate 34 to push it to a stop position with the plate end wall 150 of the second sliding valve plate 34 engaging the stoppers 70 of the support frame 30. The first gear tooth 160 of each of the inner partial gears 116 breaks free from engagement with the geared surface 154 of the opposing racks 158 by clearing the shorter second rack tooth 170 of the geared surface 154 of the associated rack 158. Concurrently, the first gear tooth 160 of each of the outer partial gears 118 engages the larger first rack tooth 162 of the geared surface 154 of the corresponding rack 158 of the first sliding valve plate 32. In other words, as the inner partial gears 116 disengage the racks 158 of the second sliding valve plate 34, the outer partial gears 118 re-engage the racks 158 of the first sliding valve plate 32. As the driving mechanism 100 continues to rotate the rotatable shaft 102, the second sliding valve plate 34 remains stationary and abutting the stoppers 70 of the support frame 30 while the teeth 128 of the outer partial gears 118 engage the geared surface 154 of the opposing racks 158 of the first sliding valve plate 32 to slide the first sliding valve plate 32 into overlapping relationship with the second sliding valve plate 34. The second sliding valve plate 34 continues to slide until the first rack tooth 162 of each of the opposite racks 158 of the second sliding valve plate 34 abuts the plate end wall 150 of the first sliding valve plate 32. At this point, the air conditioning system 10 is in a full hot position, as shown in FIGS. 7 and 7 and all of the air from the blower device 24 is directed toward the heater 28. In the full hot position, the lugs 130 of the outer partial gears 118 engage the last rack tooth 168 of the corresponding rack 158 to hold the first and second sliding valve plates 32, 34 in the full hot position.

The driving mechanism 100 of the present invention improves mixing of cold and hot air streams to achieve a desired temperature in the interior of the automotive vehicle 14 by sliding the first and second valve plates 32, 34 at various distances relative to one another between the full warm and fill cold positions. Consequently, the aim of the air conditioning system 10 is to achieve a desired comfort level for a passenger.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air conditioning assembly for an automotive vehicle comprising;
   a housing defining two air passages disposed in side by side relationship,
   a first sliding valve plate and a second sliding valve plate both supported by said housing for sliding movement across said air passages between a first position for closing one of said air passages and a second position for closing the other of said side by side air passages; and
   a driving mechanism supported by said housing for moving said first sliding valve plate from said first position to said second position while said second sliding valve plate remains in said first position and thereafter moving said second sliding valve plate from said first position to said second position while said first sliding valve plate remains in said second position,
   wherein said driving mechanism be configured to move the second sliding valve plate from said second position to said first position while said first sliding valve plate remains in said second position and thereafter moving said first sliding valve plate from said second position to said first position while second sliding valve plate remains in said first position.

2. An air conditioning assembly as set forth in claim 1 wherein each of said first and second sliding valve plates covers one half of each of said two air passages so that each of said air passages is half closed when said first sliding valve plate is in said second position and said second sliding valve plate is in said first position.

3. An air conditioning assembly as set forth in claim 2 wherein said driving mechanism includes a first set of gears each having teeth disposed partially about a semi-circular periphery thereof.

4. An air conditioning assembly as set forth in claim 3 wherein said driving mechanism includes a shaft having terminal ends rotatably supported by said housing with said first set of gears extending radially from said shaft.

5. An air conditioning assembly as set forth in claim 4 wherein said driving mechanism includes a second set of said gears extending radially from said shaft and spaced axially along said shaft from said first set of gears.

6. An air conditioning assembly as set forth in claim 5 wherein said first set of gears are axially offset from one another and said second set of partial gears with said first and second sets of partial gears presenting a meshing engagement with said first sliding valve plate and said second sliding valve plate, respectively.

7. An air conditioning assembly for an automotive vehicle as set forth in claim 6 wherein each of said first and second sliding valve plates include external and internal edges interconnected by pair of end walls and a pair of opposing racks having terminal ends, said each rack of said first and second sliding valve plates presenting a geared surface to define a meshing engagement with said partial gears of said first and second sets.

8. An air conditioning assembly for an automotive vehicle as set forth in claim 7 wherein said semi-circular periphery of each gear extends to a diametrical side and a lug extends radially from said semi-circular periphery.

9. An air conditioning assembly for an automotive vehicle as set forth in claim 8 wherein each lug presents a head and an inclined wall extending from said head to said semi-circular periphery.

10. An air conditioning assembly for an automotive vehicle as set forth in claim 9 including a neck integral with and extending perpendicularly from each partial gear connected each partial gear to said shaft.

11. An air conditioning assembly for an automotive vehicle as set forth in claim 10 wherein each terminal end of each rack of said first and second sliding valve plates presents a beveled wall presenting a frictional engagement with said inclined wall of each of said lugs of said first set of partial gears and said second set of partial gears, respectively, for selectively moving said first sliding valve plate in one of clockwise and counterclockwise directions from said first position to said second position while said second sliding valve plate remains in said first position and thereafter moving said second sliding valve plate in another of said clockwise and said counterclockwise directions from said first position to said second position while said first sliding valve plate remains in said second position.

12. An air conditioning assembly for an automotive vehicle as set forth in claim 11 including a support frame disposed in said housing for supporting said first sliding valve plate and second sliding valve plate, said support frame having top and bottom portions with each of said top portion and bottom portion having spaced side walls.

13. An air conditioning assembly for an automotive vehicle as set forth in claim 12 including a pocket portion defined in each of said spaced side walls of said bottom portion having a first semi-circular opening defined therein.

14. An air conditioning assembly for an automotive vehicle as set forth in claim 13 including a pair of convex tracks with each of said tracks integral with and extending from said pocket portion to each of said spaced side walls of said bottom portion to define a track connection therebetween.

15. An air conditioning assembly for an automotive vehicle as set forth in claim 14 including a plurality of female connectors integral with said bottom portion and male connectors integral with said top portion.

16. An air conditioning assembly for an automotive vehicle as set forth in claim 15 wherein said top portion is pivotably connected to said bottom portion and presenting an overlapping engagement with said bottom portion with said male connector engaged in said female connectors.

17. An air conditioning assembly for an automotive vehicle as set forth in claim 16 including a second semi-circular opening defined in each said spaced side wall of said top portion to complement with said first semi-circular opening to define a window as said top and bottom portions of said support frame are engaged one with another with said shaft extending through and supported in said window.

18. An air conditioning assembly for an automotive vehicle as set forth in claim 17 wherein said support frame presents a planar configuration.

19. An air conditioning assembly for an automotive vehicle as set forth in claim 17 wherein said support frame presents a barreled configuration.

20. An air conditioning assembly for an automotive vehicle as set forth in claim 18 wherein each of said first and second sliding valve plates presents a planar configuration to mate with said support frame having said planar configuration.

21. An air conditioning assembly for an automotive vehicle as set forth in claim 19 wherein each of said first and second sliding valve plates presents a generally barreled configuration to mate with said support frame having said barreled configuration.

22. An air conditioning assembly for an automotive vehicle as set forth in claim 1 wherein said first and second sliding valve plates are formed from a polymeric material.

\* \* \* \* \*